United States Patent [19]
Ohki et al.

[11] Patent Number: 5,534,926
[45] Date of Patent: Jul. 9, 1996

[54] MULTIPLEX TRANSMISSION METHOD FOR MOTION PICTURE SIGNALS AND APPARATUS THEREFOR

[75] Inventors: Junichi Ohki; Toshio Koga, both of Tokyo, Japan

[73] Assignee: NEC Corporation, Tokyo, Japan

[21] Appl. No.: 213,588

[22] Filed: Mar. 16, 1994

[30] Foreign Application Priority Data

Mar. 17, 1993 [JP] Japan .................... 5-056645

[51] Int. Cl.$^6$ .............................................. H04N 7/12
[52] U.S. Cl. ........................................ 348/385; 348/388
[58] Field of Search ................................ 348/385, 388, 348/469, 465, 487; 370/57, 112, 118; H04N 7/12

[56] References Cited

U.S. PATENT DOCUMENTS

| | | | |
|---|---|---|---|
| 4,673,974 | 6/1987 | Ito et al. ................................ | 348/159 |
| 4,783,779 | 11/1988 | Takahata et al. ....................... | 370/118 |
| 4,814,869 | 3/1989 | Oliver, Jr. ............................... | 348/159 |
| 4,975,771 | 12/1990 | Kassatly ............................ | 348/388 X |
| 4,995,036 | 2/1991 | Copen et al. ...................... | 348/388 X |
| 5,115,309 | 5/1992 | Hang ....................................... | 348/388 |

OTHER PUBLICATIONS

"Statistical Performance Analysis of an Interframe Encoder for Broadcast Television Signals", by Toshio Koga et al., IEEE Transactions on Communications, COM–29, No. 12, 1981, pp. 1,868–1,876.

"Digital Transmission of Broadcast Television with Reduced Bit Rate", by Hisashi Kaneko et al., NEC'77 Conference Record, vol. 1, Los Angeles Marriott Hotel, Dec. 5–6–7, 1977.

*Primary Examiner*—Victor R. Kostak
*Attorney, Agent, or Firm*—Sughrue, Mion, Zinn, Macpeak & Seas

[57] ABSTRACT

A multiplex transmission method and apparatus for motion picture signals. A transmission line constituted by transmission channels having different carrier frequencies is prepared. One of the transmission channels has a transmission rate almost equal to the long-term average of information generation speeds in encoding an arbitrary motion picture signal. The input motion picture signal is encoded by using inter-frame and intra-frame correlations, and encoded information is output for each image channel. The image channels are related in one-to-one correspondence with the transmission channels having the different carrier frequencies. When an image channel of interest, of the image channels, exhibits a large generated information amount representing the encoded information generation speed within a time interval determined by a predetermined transmission rate of the transmission line in advance, adaptive multiplexing is performed by dividing and distributing the encoded information of the image channel of interest to the transmission channels including the transmission channel of the image channel of interest. The encoded information divided/distributed by the adaptive multiplexing is transmitted for each allocated transmission channel.

15 Claims, 12 Drawing Sheets

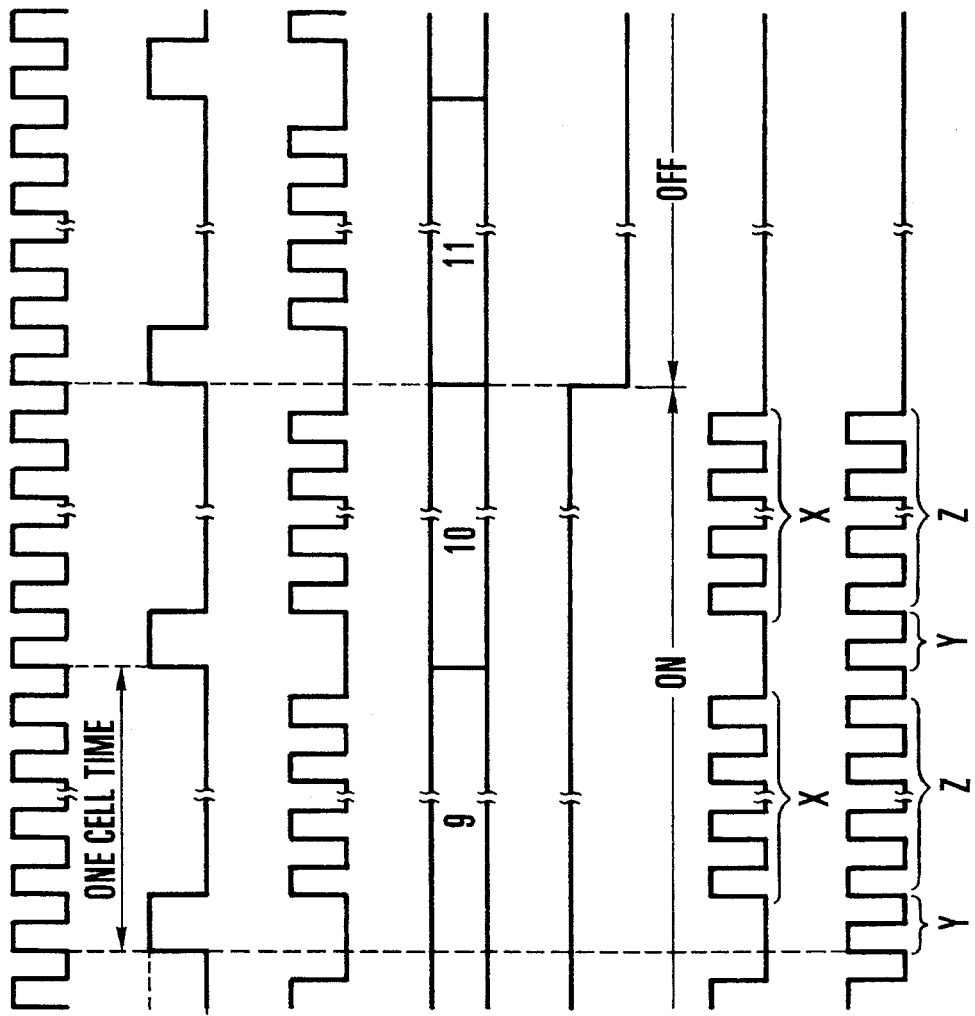
FIG.6A CLOCK
FIG.6B CELL SYNC SIGNAL
FIG.6C GATE CLOCK
FIG.6D CELL NUMBER
FIG.6E GATE SIGNAL
FIG.6F READ CLOCK
FIG.6G WRITE CLOCK

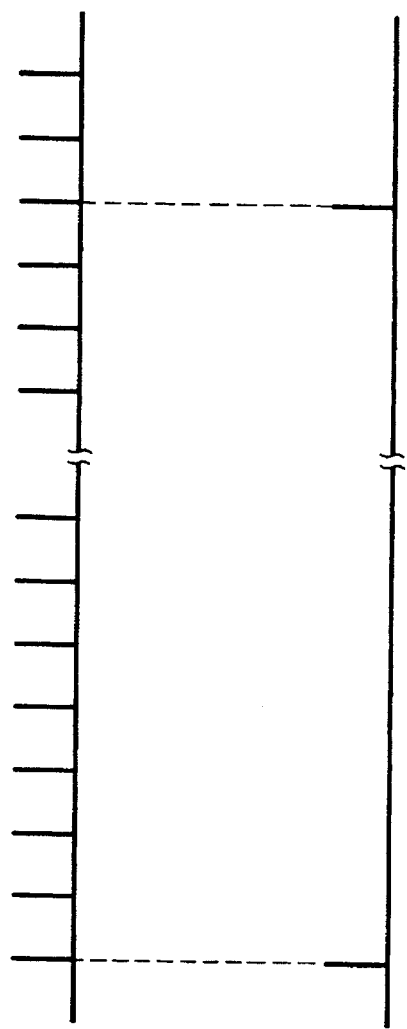

5,534,926

MULTIPLEX TRANSMISSION METHOD FOR MOTION PICTURE SIGNALS AND APPARATUS THEREFOR

BACKGROUND OF THE INVENTION

The present invention relates to a multiplex transmission method for motion picture signals and an apparatus therefor and, more particularly, to a multiplex transmission method for motion picture signals, in which motion picture signals from a plurality of channels are encoded by using a band compression technique, and multiplex transmission of the encoded data is performed by using a band-limited line, and an apparatus therefor.

As a conventional multiplex transmission method for motion picture signals, a method is disclosed in "Statistical Performance Analysis of an Interframe Encoder for Broadcast Television Signals", IEEE TRANSACTIONS ON COMMUNICATIONS, COM-29, No. 12, 1981, pp. 1,868–1,876.

This method is based on the fact that the statistical characteristics of input motion picture signals between a plurality of channels are generally independent of each other with respect to multiplex transmission of a plurality of encoded channel motion picture signals, and there is no correlation between the amounts of generated information in encoding the signals. That is, there is a very low probability that the amounts of encoded information output from the respective encoders are maximized at the same time. In addition, no substantial deterioration in image quality occurs in a channel with a small amount of generated information even if the transmission rate is low. Therefore, an excess portion can be subtracted from the transmission rate allocated to the channel, and the corresponding portion can be allocated to a channel with a large amount of generated information, thereby achieving an improvement in image quality. Obviously, the total transmission rate remains the same.

FIG. 12 shows a multiplex transmission system to which such a conventional multiplex transmission method for a plurality of motion picture signals is applied.

Referring to FIG. 12, different motion picture signals from image channels CH1 to CHn are generally supplied to encoders A1 to An corresponding to the image channels, respectively. The encoders A1 to An then encode the signals. Each of the encoders A1 to An supplies encoded data 91, including video and audio information and information required for decoding an encoded image at the receiving end, to a variable rate multiplexer 94 together with information 90 indicating the amount of generated information. The variable rate multiplexer 94 adaptively determines allocation of transmission rates to the respective channels at predetermined intervals, e.g., 125 μsec, by referring to the information 90 indicating the amount of generated information, which is supplied from each of the encoders A1 to An (when the amount of generated information in a given image channel is large, part of the information is allocated to another transmission channel with a small amount of generated information, i.e., determination of adaptive multiplexing is performed). The variable rate multiplexer 94 then supplies read clocks 93 corresponding to transmission rates allocated to the respective channels to the encoders A1 to An, respectively.

The encoders A1 to An read the encoded data 91 in accordance with the read clocks supplied from the variable rate multiplexer 94, and supply the read data to the variable rate multiplexer 94. The variable rate multiplexer 94 adds pieces of image channel identification information to the encoded data 91 supplied from the encoders A1 to An and multiplexes them. The variable rate multiplexer 94 then outputs the resultant data to a transmission line L having a large-capacity fixed transmission rate.

Each of the encoders A1 to An includes a buffer memory for leveling the amounts of the encoded data 91, which undergoes a great variation instantly, at an output timing. With this arrangement, the encoders A1 to An can properly respond to a read operation of the variable rate multiplexer 94 at variable rates.

At the receiving end, the multiplexed encoded data of the plurality of channels, which are supplied through the transmission line L having the large-capacity fixed transmission rate, are received, and each identification information is detected. A variable rate separator 95 then separates the encoded data 91 into encoded data 96 for the respective image channels. The separated encoded data 96 of the respective channels are supplied to decoders B1 to Bn, respectively, together with write clocks 97. The encoded data 96 are then decoded by the decoders B1 to Bn for the respective channels, thereby obtaining reproduced images.

By performing such an adaptive multiplex operation, a substantially high transmission rate can be allocated to a motion picture signal of a channel exhibiting the maximum amount of generated information. Therefore, a great reduction in encoding distortion can be achieved. In addition, the encoding distortion of a motion picture signal exhibiting the minimum amount of generated information does not increase, and hence an improvement in overall image quality can be realized.

In order to efficiently use a transmission line and transmit motion picture signals by performing variable rate multiplexing with respect to a plurality of channels in accordance with the amounts of generated information in the above-described conventional multiplex transmission apparatus for motion picture signals, the transmission line needs to have a high transmission rate of several tens Mb/s corresponding to a plurality of channels, or an ultra-high transmission rate of several hundreds Mb/s as the number of multiplex channels increases. However, in a satellite circuit or even in a terrestrial circuit, if the band is greatly limited, such an ultra-high rate transmission line cannot be ensured.

Furthermore, according to the conventional multiplex method, since separation of all channels is required at the receiving end, decoders equal in number to the multiplex channels at the transmitting end must be prepared and used, and decoding cannot be performed with respect to only a desired channel. These channels, however, are not necessarily used all the time. Furthermore, in many instances, the receiving end need not receive or decode signals from all the channels.

For this arrangement, the size of an apparatus at the receiving end inevitably increases.

SUMMARY OF THE INVENTION

It is an object of the present invention to provide a motion picture signal transmission method and apparatus therefor, which can reduce the bandwidth of a transmission line.

It is another object of the present invention to provide a motion picture signal transmission method and apparatus therefor, which can receive only data transmitted through some of image channels with a small-size arrangement.

In order to achieve the above objects, according to the present invention, there is provided a multiplex transmission method for motion picture signals, comprising the steps of preparing a transmission line constituted by a plurality of transmission channels having different carrier frequencies, one of the transmission channels having a transmission rate substantially equal to a long-term average of information generation speeds in encoding an arbitrary motion picture signal, encoding the input motion picture signal by using inter-frame and intra-frame correlations and outputting encoded information for each image channel, relating the image channels in a one-to-one correspondence with the transmission channels having the different carrier frequencies, when an image channel of interest, of the image channels, exhibits a large generated information amount representing the encoded information generation speed within a time interval determined by a predetermined transmission rate of the transmission line in advance, performing adaptive multiplexing by dividing and distributing the encoded information of the image channel of interest to the transmission channels including the transmission channel of the image channel of interest, and transmitting the encoded information divided/distributed by the adaptive multiplexing for each allocated transmission channel.

In addition, according to the present invention, there is provided a multiplex transmission apparatus for motion picture signals, comprising a transmission line constituted by a plurality of transmission channels having different carrier frequencies, one of the transmission channels having a transmission rate substantially equal to a long-term average of information generation speeds in encoding an arbitrary motion picture signal, a plurality of encoding means, arranged for the respective image channels, for encoding the input motion picture signal by using inter-frame and intra-frame correlations and outputting encoded information, each of the encoding means having a buffer memory for interfacing with the transmission line to temporarily store the encoded information and output at a designated rate, and outputting a generated information amount representing a generation speed of the encoded information, variable rate multiplex means for designating an output rate of the encoded information with respect to each of the encoding means in accordance with the generated information amount output from the encoding means, adding identification information indicating a relationship with the image channel to an output from each of the encoding means, and for, when at least one image channel of interest exhibits the generated information amount exceeding the predetermined transmission rate, distributing the encoded information of the image channel of interest to at least two transmission channels of the transmission channels and outputting the information for each transmission channel, and a plurality of transmitting means for receiving pieces of information of the respective transmission channels from the variable rate multiplex means and outputting signals caused to correspond to the respective transmission channels by using a predetermined modulation scheme.

BRIEF DESCRIPTION OF THE DRAWINGS

FIGS. 6A to 6G are timing charts for explaining the operation of the variable rate multiplexer 20;

FIGS. 7A and 7B are timing charts for showing the relationship between the cell sync signal shown in FIG. 6B and a trigger signal;

DESCRIPTION OF THE PREFERRED EMBODIMENTS

Embodiments of the present invention will be described below with reference to the accompanying drawings.

Figure 1:
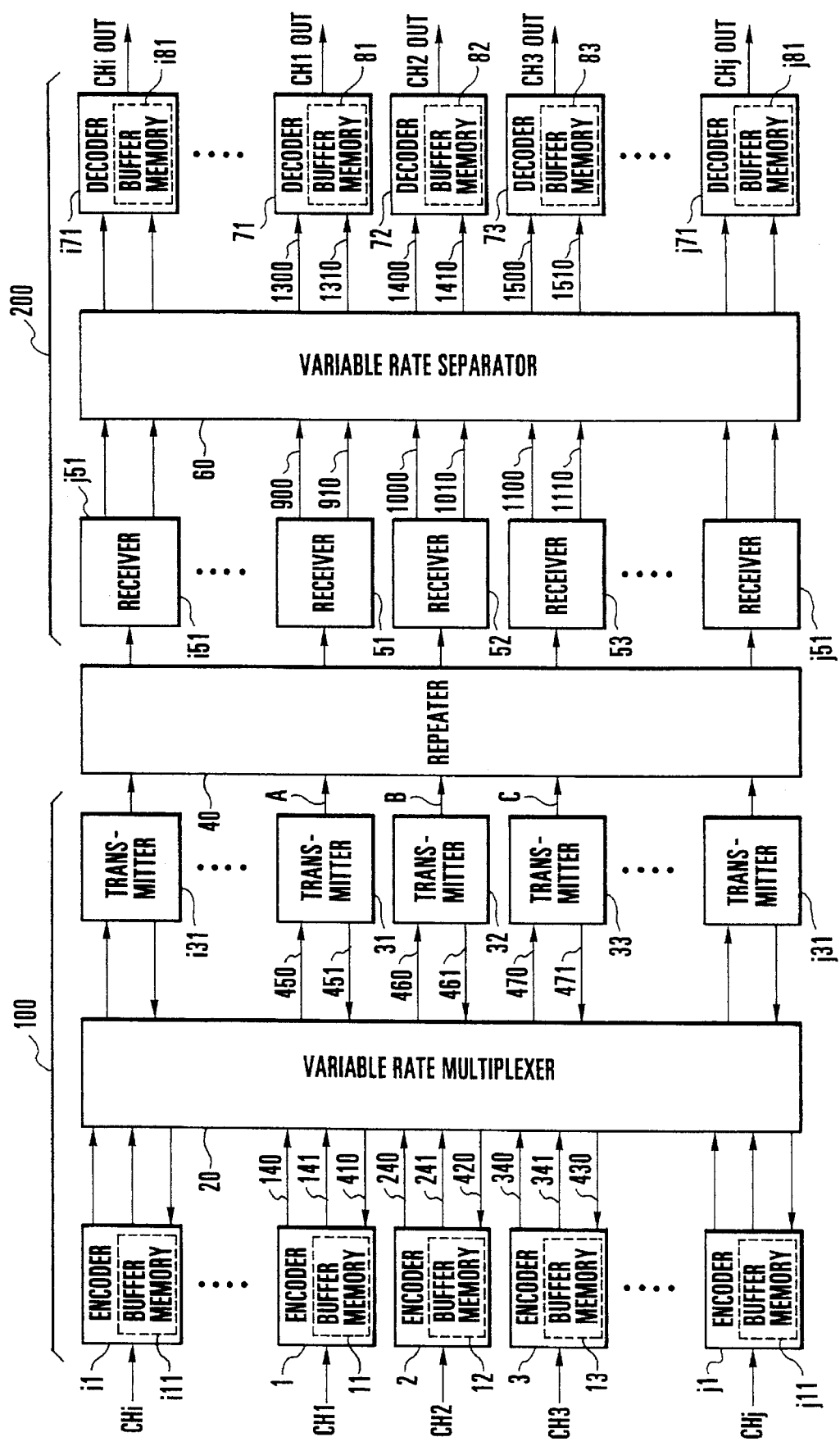
FIG. 1 is a block diagram showing a multiplex transmission method for motion picture signals and an apparatus therefor according to an embodiment of the present invention.

FIG. 1 shows a multiplex transmission apparatus for motion picture signals according to an embodiment of the present invention.

Referring to FIG. 1, the multiplex transmission apparatus includes a transmitting section 100 constituted by encoders i1 to 1, 2, and 3 to j1, a variable rate multiplexer 20, and a plurality of transmitters i31 to 31, 32, and 33 to j31. The encoders i1 to 1, 2, and 3 to j1 are respectively designed to receive input motion picture signals from a total of m channels, i.e., image channels CH1 to CHj, and have buffer memories i11 to 11, 12, and 13 to j11. The variable rate multiplexer 20 receives encoded data as encoded input motion picture signals output from the encoders i1 to 1, 2, and 3 to j1, together with pieces of generated information amounts indicating encoded data amounts. The variable rate multiplexer 20 then properly divide and distributes these encoded data, and outputs them for the respective transmission channels. The transmitters i31 to 31, 32, and 33 to j31 respectively receive outputs from the variable rate multiplexer 20, convert them into signals having different carrier frequencies and modulated in a predetermined form, and output the signals.

The multiplex transmission apparatus shown in FIG. 1 also includes a repeater 40 for receiving signals output from the transmitting section 100 and relaying the signals to a receiving section 200 (to be described later). This repeater 40 may be installed in an artificial satellite or on the ground.

In addition, the multiplex transmission apparatus shown in FIG. 1 includes the receiving section 200 constituted by a plurality of receivers i51 to 51, 52, and 53 to j51, a variable rate separator 60, and a plurality of decoders i71 to 71, 72, and 73 to j71. The receivers i51 to 51, 52, and 53 to j51 respectively receive signals output from the repeater 40 and output demodulated signals. The variable rate separator 60 distributes and outputs the signals output from the receivers i51 to 51, 52, and 53 to j51 to encoded data corresponding to the image channels CHi to CHj and input to the transmitting section 100. The decoders i71 to 71, 72, and 73 to j71 respectively decode the encoded data output from the variable rate separator 60 into the original signals of the original image channels CHi to CHj, and output the decoded signals. The decoders i71 to 71, 72, and 73 to j71 respectively have buffer memories i81 to 81, 82, and 83 to j81.

The operation of the multiplex transmission apparatus shown in FIG. 1 will be described next.

The encoders i1 to 1, 2, and 3 to j3 respectively receive motion picture signals from the image channels CHi to CHj, and output encoded data obtained by using a predetermined encoding algorithm.

The encoders i1 to 1, 2, and 3 to j1 temporarily store the encoded data in the internal buffer memories j11 to 11, 12, and 13 to j11. At the same time, the encoders i1 to 1, 2, and 3 to j1 supply, to the variable rate multiplexer 20, the amounts of the encoded data stored in the buffer memories i11 to 11, 12, and 13 to j11 in the encoding operation, i.e., the occupancy amounts (e.g., the numbers of stored bits) of the buffer memories i11 to 11, 12, and 13 to j11, as generated information amounts.

The operations of the image channels CH1, CH2, and CH3 will be described below, considering the image channel CH2 as a channel of interest. Assume that when the generated information amount of the image channel CH2 is large, portions of a signal of the image channel CH2 are assigned not only to a transmission channel B corresponding to the image channel CH2 but also to one or both of adjacent transmission channels A and C. That is, when the information amount of the image channel CH2 is large, signal portions are distributed to a maximum of three transmission channels of adjacent transmission channels, i.e., a distribution channel count n is three.

The generated information amounts of the encoders 1 to 3 which receive the motion picture signals from the image channels CH1 to CH3 are supplied to the variable rate multiplexer 20 via lines 140, 240, and 340, respectively.

At this time, generated information amounts are also output from other encoders, e.g., the encoders i1 and j1, to the variable rate multiplexer 20 in the same manner as described above.

The variable rate multiplexer 20 monitors the generated information amounts supplied from all the encoders i1 to 1, 2, and 3 to j1 to be subjected to multiplexing; allocates transmission rates in accordance with the generated information amounts of the respective image channels CHi to CHj at predetermined time intervals, e.g., 125 μsec; and supplies read clocks corresponding to the allocated transmission rates to the encoders 1, 2, and 3 and other encoders, e.g., the encoder i1.

The maximum transmission rate of each transmission channel (e.g., the transmission channel A or B) is predetermined to be almost equal to the long-term average of generated information amounts (information generation speed) in consideration of the correlation between the amount of frame information to be handled in the image channel CH1 or CH2 at an arbitrary timing and the amount of information to be handled for continuous frames.

In this case, the variable rate multiplexer 20 supplies read clocks to the encoders 1 to 3 via lines 410, 420, and 430, respectively.

The encoder 1 reads out the encoded image data temporarily stored in the internal buffer memory 11 in accordance with the read clock supplied from the variable rate multiplexer 20, and supplies the data to the variable rate multiplexer 20 via the line 141.

Similarly, the encoders 2 and 3 read out the encoded image data temporarily stored in the internal buffer memories 12 and 13 in accordance with the read clocks supplied from the variable rate multiplexer 20, and supply the data to the variable rate multiplexer 20 via the lines 241 and 341, respectively.

The variable rate multiplexer 20 forms the encoded image data supplied from the encoders 1 to 3 into groups, i.e., cells, each consisting of a plurality of bit strings, for the respective image channels CH1 to CH3.

The variable rate multiplexer 20 adds an image channel name and an identification header to each cell. Each image channel name indicates a specific one of the channels CH1 to CH3 to which a corresponding cell belongs. Each identification header indicates the ordinal number of a corresponding cell in a corresponding one of the channels CH1 to CH3.

The cells to which the identification headers are added by the variable rate multiplexer 20 are adaptively multiplexed between the transmission channels, and are read out to be output to the respective transmission channels in accordance with transmission line clocks supplied from the transmitters 31 to 33 for the respective transmission channels.

The cells to be transmitted through the transmission channels A, B, and C are supplied from the variable rate multiplexer 20 to the transmitters 31, 32, and 33 via lines 450, 460, and 470, respectively.

Cells similar to those described above are also supplied from the variable rate multiplexer 20 to other transmitters, e.g., the transmitters i31 and j31.

As the transmitters 31 to 33 and other transmitters i31 and j31, for example, transmitters of an SCPC (single channel per carrier) scheme or the like may be used.

Each of the above transmitters 31 to 33 transmits encoded image data formed into cells at a predetermined rate. The transmitters 31 to 33 generate the above-mentioned transmission line clocks and supply them to the variable rate multiplexer 20 via the lines 451, 461, and 471, respectively. Other transmitters, e.g., the transmitters i31 and j31, also generate similar transmission line clocks and output them to the variable rate multiplexer 20.

The transmitter 31 modulates the data supplied from the variable rate multiplexer 20 via the line 450 by a predetermined modulation scheme, and transmits the modulated data to the repeater 40.

Similarly, the transmitters 32 and 33 modulate the data, e.g., the cells, supplied from the variable rate multiplexer 20 via the lines 460 and 470 by a predetermined modulation scheme, and transmit the modulated data to the repeater 40.

Other transmitters, e.g., the transmitters i31 and j31, also transmit similar signals to the repeater 40.

The repeater 40 receives the signals transmitted from the transmitters 31 to 33 and the like, and transmits the signals to the receivers 51 to 53 and the like.

The receivers 51 to 53 reproduce the signals transmitted through carriers to obtain the original encoded data formed into the cells.

In addition, the receivers 51 to 53 respectively generate transmission line clocks from the received signal, which clocks have the same speeds as those of the clocks transmitted from the transmitters 31 to 33.

The encoded data reproduced by the receiver 51 is supplied to the variable rate separator 60 via a line 900, while the transmission line clock generated by the receiver 51 is supplied to the variable rate separator 60 via a line 910.

Similarly, the encoded data reproduced by the receiver 52 is supplied to the variable rate separator 60 via a line 1000, while the transmission line clock generated by the receiver 52 is supplied to the variable rate separator 60 via a line 1010.

In addition, the encoded data reproduced by the receiver 53 is supplied to the variable rate separator 60 via a line 1100, while the transmission line clock generated by the receiver 53 is supplied to the variable rate separator 60 via a line 1110.

Other transmitters such as the transmitters i51 and j51 perform the same operation as that of the above-described receivers.

The variable rate separator 60 detects the identification headers of the cells supplied from the receivers 51 to 53, and arranges the cells for the image channels CH1 to CH3 in order. At this time, the identification headers are removed to obtain the same encoded data as the original encoded data input to the variable rate multiplexer 20. The encoded data of the image channels CH1, CH2, and CH3, which are arranged by the variable rate separator 60, are supplied to the decoders 71, 72, and 73 via lines 1300, 1400, and 1500, respectively.

The variable rate separator 60 performs the same operation as that for the above-described decoders, e.g., the decoder 71, with respect to other decoders such as the decoders i71 and j71.

The decoder 71 writes the data, supplied from the variable rate separator 60 via the line 1300, in the internal buffer memory 81 in accordance with a write clock supplied from the variable rate separator 60 via a line 1310. Similarly, the decoder 72 writes the data, supplied from the variable rate separator 60 via the line 1400, in the internal buffer memory 82 in accordance with a write clock supplied via a line 1410.

In addition, the decoder 73 writes the data, supplied from the variable rate separator 60 via the line 1500, in the internal buffer memory 83 in accordance with a write clock supplied via a line 1510.

The decoders 71 to 73 read out and decode the data written in the internal buffer memories 81 to 83, reproduce the original motion picture signals of the image channels CH1 to CH3, and output the signals outside.

Other decoders such as the decoders i71 and j71 perform the same operation as that of the above-described decoders, e.g., the decoder 71.

FIGS. 2A to 2E show how the multiplex transmission apparatus shown in FIG. 1 distributes the image channels CH1 to CH3 to transmission channels (variable rate transmission multiplexing).

The basic operation of the variable rate multiplexer 20 will be described below with reference to FIGS. 2A to 2E. In this case, if a transmission capacity of 6 Mb/s is given per carrier, i.e., an average transmission capacity of 6 M/s per image channel, a total transmission capacity of 18 Mb/s is given between adjacent three channels. The variable rate multiplexer 20 allocates transmission rates for a total of 18 Mb/s in accordance with the generated information amounts of the respective image channels CH1 to CH3.

Assume that pieces of information, each corresponding to 5 Mb/s, are respectively generated in the image channel CH1 and an adjacent image channel CH0 (not shown); information corresponding to 9 Mb/s is generated in the image channel CH2; and pieces of information, each corresponding to 8 Mb/s, are respectively generated in the image channel CH3 and an adjacent image channel CH4 (not shown).

When the pieces of information of these image channels are multiplexed and transmitted through the transmission channels having difference carrier frequencies, the total transmission rate is always controlled to be 18 Mb/s between the three adjacent transmission channels.

In a multiplex operation, the variable rate multiplexer 20 forms encoded data for the respective channels CH1 to CH3, read out from the encoders 1 to 3, into groups, each consisting of a plurality of bit strings, and adds channel numbers and headers as pieces of information identifying the group numbers to the respective groups, thus generating cells, each consisting of a header and encoded bit strings. These cell data of the respective image channels CH1 to CH3 are distributed to the respective transmission channels.

The data of the image channels CH1 to CH3 are basically transmitted to the transmission channels exhibiting a one-to-one correspondence with the image channels. However, a portion exceeding the transmission rate of a given transmission channel, or a portion exceeding the transmission rate of the image channel corresponding to the transmission channel upon distribution of data from an adjacent channel, is further distributed to an adjacent transmission channel. A method of performing such distribution will be described in detail below.

Assume that, in principle, the variable rate multiplexer 20 outputs cell data of the image channel CH0 to a transmission channel Z (not shown) adjacent to information of the transmission channel A in FIG. 1; cell data of the image channel CH1 to the transmission channel A; cell data of the image channel CH2 to the transmission channel B; cell data of the image channel CH3 to the transmission channel C; and cell data of an image channel CH4 (not shown), located immediately below the image channel CH3, to a transmission channel D (not shown) located immediately below the transmission channel C in FIG. 1.

The variable rate multiplexer 20 distributes part of the cell data of a given image channel which exceeds the average transmission rate to adjacent transmission channels having free transmission rates. More specifically, in this embodiment, since an average transmission capacity of 6 Mb/s is given per transmission channel, part of cell data of a given image channel which exceeds a transmission rate of 6 Mb/s is distributed to adjacent transmission channels having non-allocated transmission rates.

Assume that transmission rates of 5 Mb/s, 5 Mb/s, 9 Mb/s, 4 Mb/s, and 8 Mb/s are respectively allocated to the image channels CH0, CH1, CH2, CH3, and CH4 at a certain time. In this case, in principle, data of the image channels CH0 to CH4 are transmitted through transmission channels corresponding to the respective image channels CH.

Figure 2:
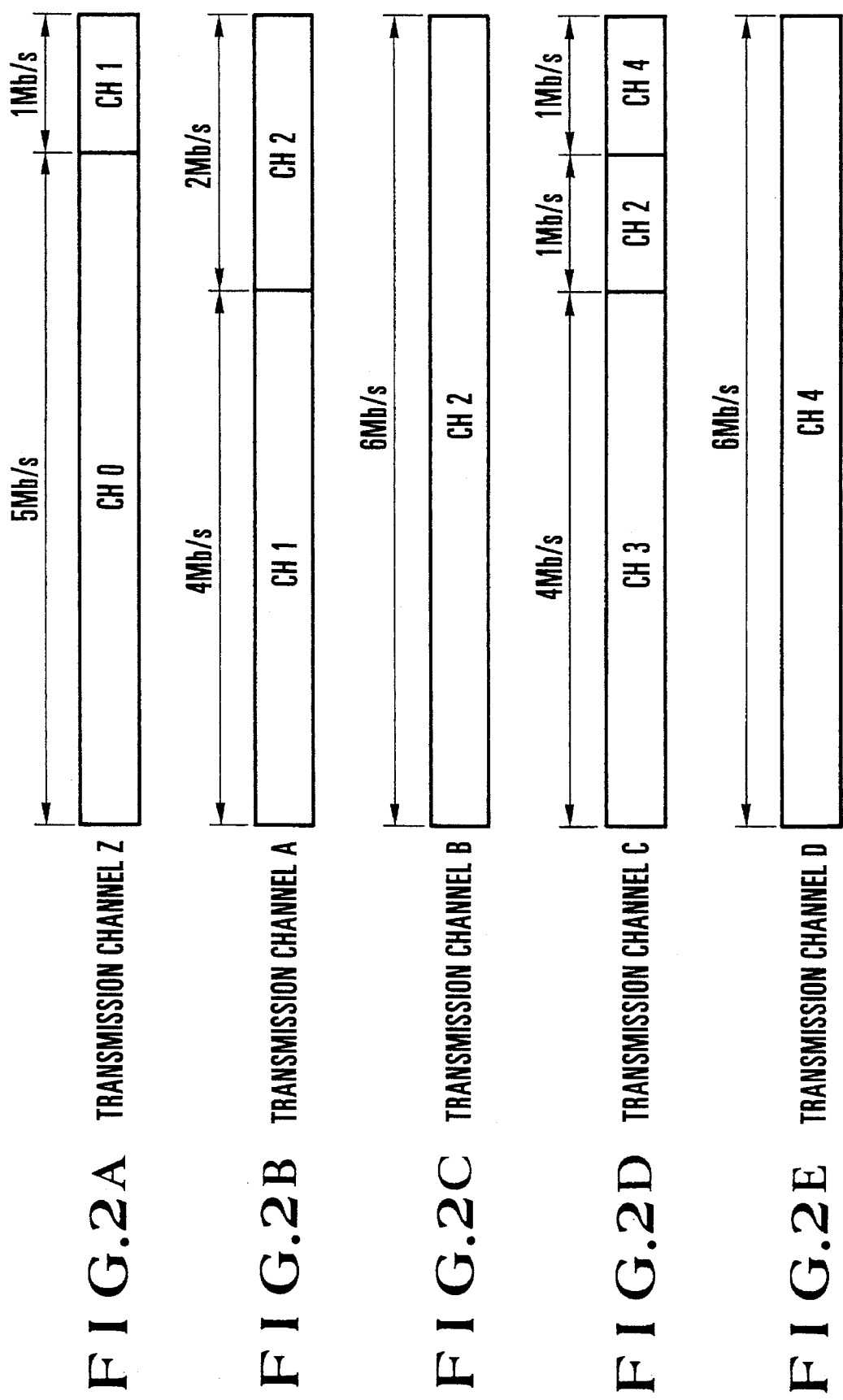
FIGS. 2A to 2E are charts for explaining how the multiplex transmission apparatus for motion picture signals, shown in FIG. 1, distributes image channels to transmission channels.

If, however, a transmission rate allocated at a certain time exceeds the transmission rate of a given transmission channel, as in the case of the data of the image channel CH2 in FIG. 2, data transmission is performed by adaptively using the transmission rates of the adjacent transmission channels A and C, as shown in FIGS. 2B and 2D.

More specifically, the variable rate multiplexer 20 distributes 2-Mb/s data, of 3-Mb/s data which exceeds 6 Mb/s of the image channel CH2, to the transmission channel A in FIG. 2B; and the remaining 1-Mb/s data to the transmission channel C in FIG. 2D. Since the 2-Mb/s data of the image channel CH2 is distributed to the transmission channel A, 1-Mb/s data of all the 5-Mb/s data of the image channel CH1 corresponding to the transmission channel A cannot be transmitted. For this reason, the 1-Mb/s data of the image channel CH1 is distributed to the transmission channel Z in FIG. 2A.

Even after the 4-Mb/s data of the image channel CH3 and the 1-Mb/s data of the image channel CH2 are distributed to the transmission channel C, the transmission channel C still has a non-allocated transmission rate of 1 Mb/s. Therefore, as shown in FIG. 2D, the variable rate multiplexer 20 distributes the data of the image channel CH4 to this 1 Mb/s. As shown in FIG. 2E, the variable rate multiplexer 20 performs distribution of data, i.e., adaptive multiplexing, to cause the transmission channel D to transmit 6-Mb/s data of the 8-Mb/s data of the image channel CH4.

Since 1-Mb/s data of the remaining 2-Mb/s data of the image channel CH4 is distributed to the transmission channel C in FIG. 2D, the remaining 1-Mb/s data is distributed to a transmission channel E (not shown) adjacent to the transmission channel D.

The above description is made mainly with reference to the image channel CH2 in which the generated information amount is the highest and to which the highest transmission rate is allocated. However, even in multiplexing among three channels, in order to perform the most efficient multiplex operation, transmission rates need to be distributed in consideration of all the image channels as a whole as well as channels adjacent to an image channel of interest. The details of a distribution method are not essential to the present invention, and hence a description thereof will be omitted.

Figure 3:
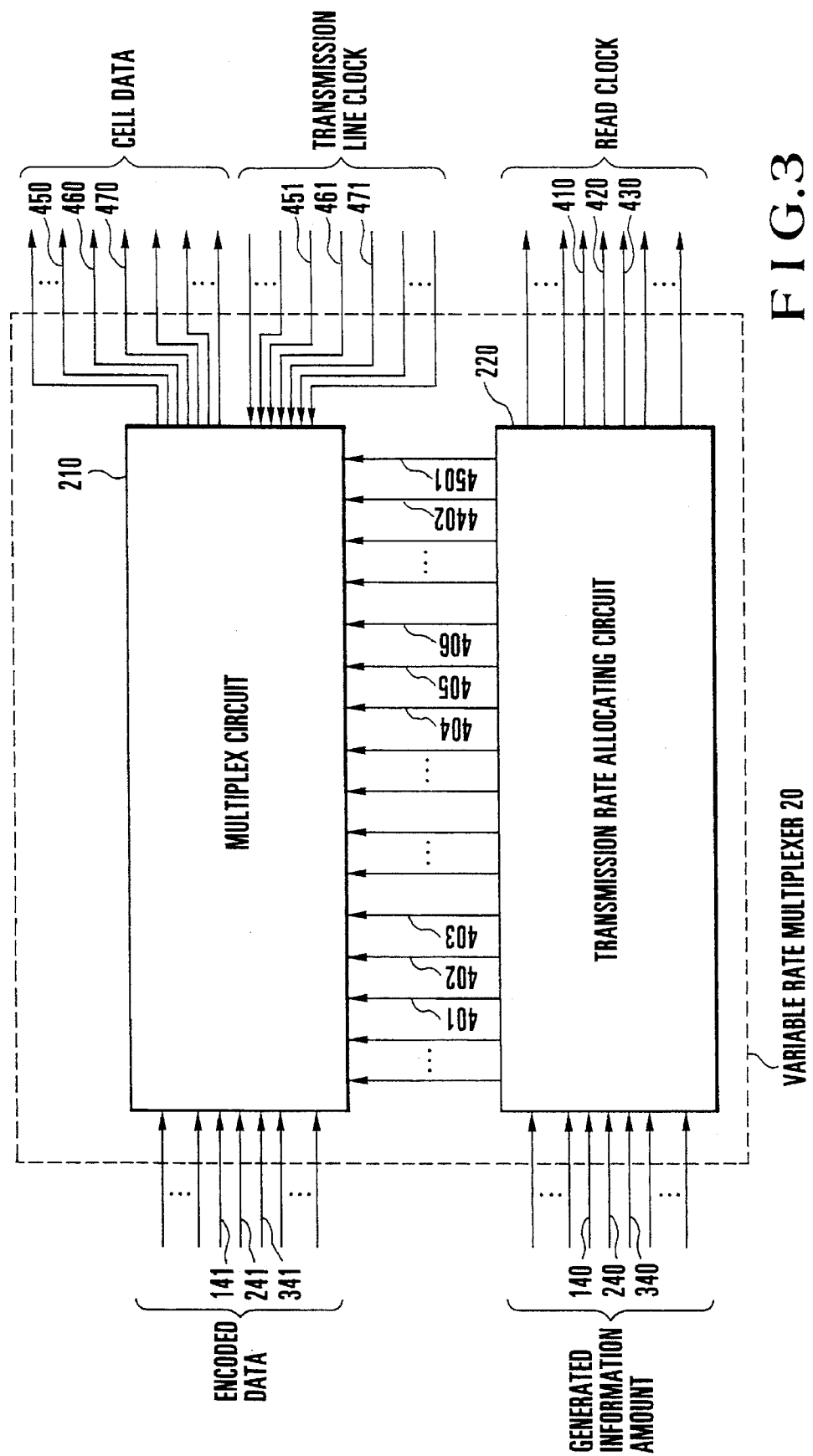
FIG. 3 is a block diagram showing the arrangement of a variable rate multiplexer 4 in FIG. 1.
Figure 4:
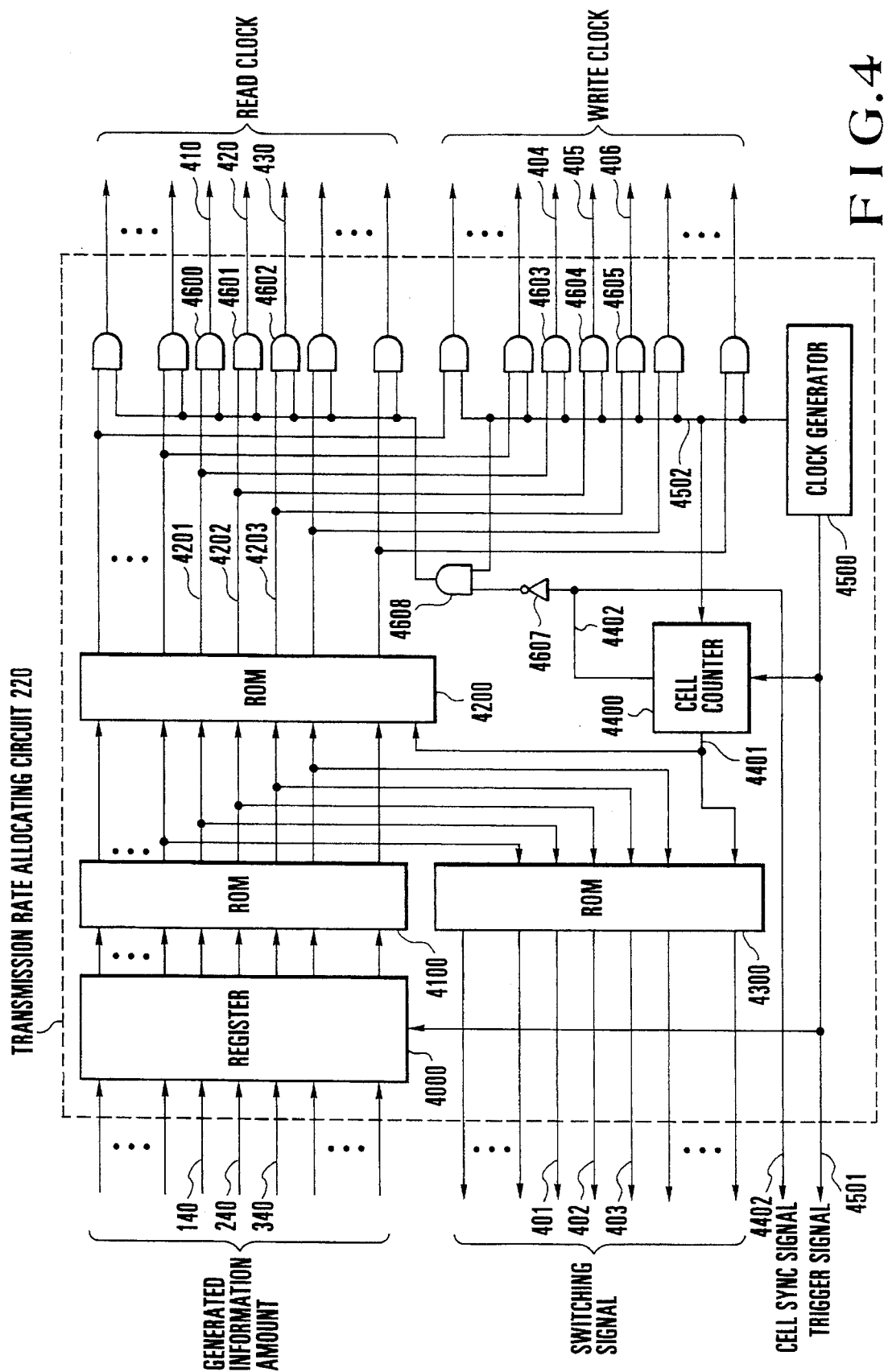
FIG. 4 is a block diagram showing the detailed arrangement of a transmission rate allocating circuit 220 in FIG. 3
Figure 5:
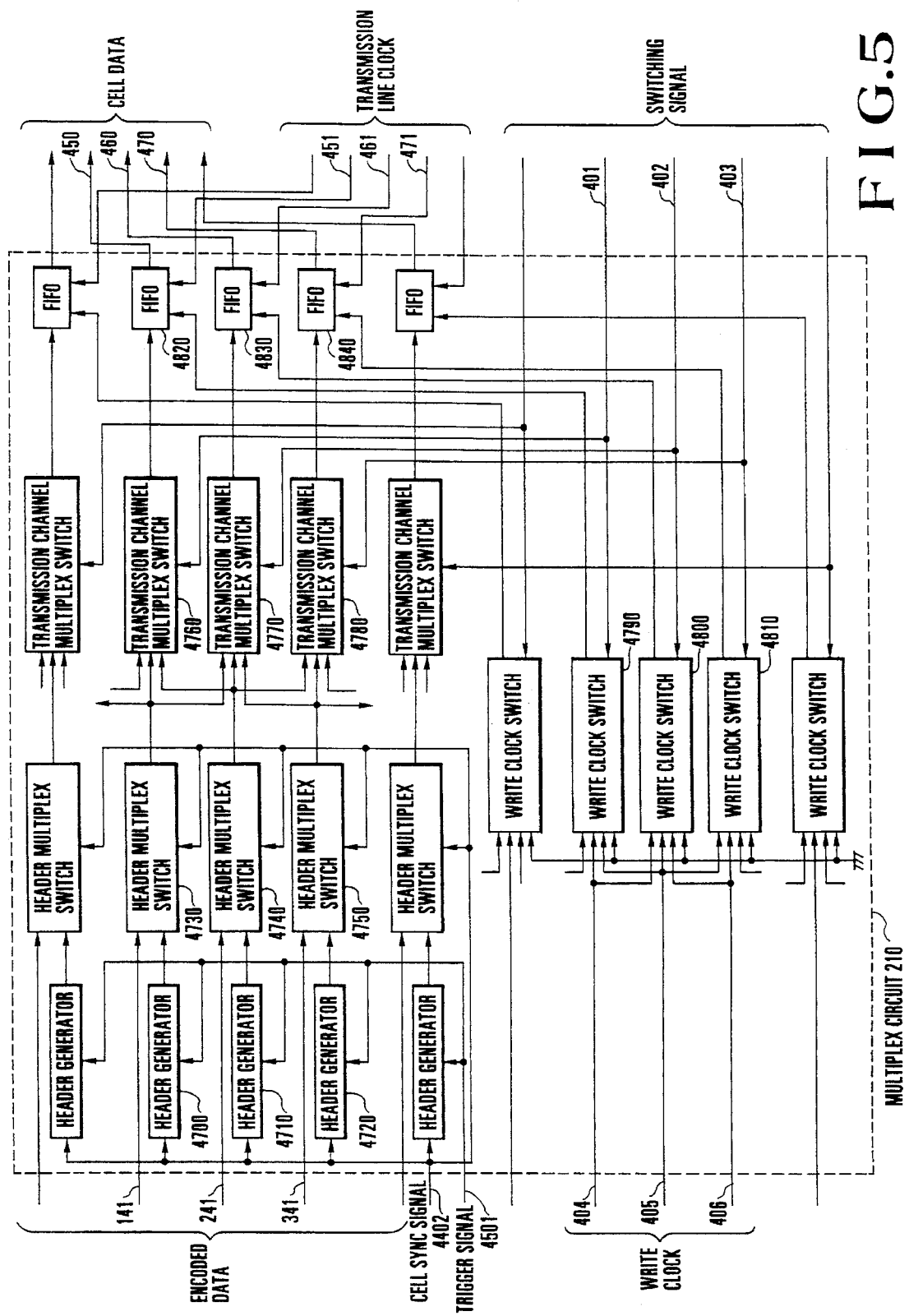
FIG. 5 is a block diagram showing the detailed arrangement of a multiplex circuit 210 in FIG. 3.

FIG. 3 shows the arrangement of the variable rate multiplexer 20 in FIG. 1. FIG. 4 shows the detailed arrangement of a transmission rate allocating circuit 220 in FIG. 3. FIG. 5 shows the detailed arrangement of a multiplex circuit 210 in FIG. 3.

FIGS. 6A to 6G show how the variable rate multiplexer 20 operates. FIG. 7 shows the relationship between a trigger signal and the cell sync signal shown in FIG. 6B.

The details of the variable rate multiplexer 20 will be described next with reference to FIGS. 3 to 7. As shown in FIG. 3, the variable rate multiplexer 20 is constituted by the transmission rate allocating circuit 220 and the multiplex circuit 210.

As shown in FIG. 4, the transmission rate allocating circuit 220 comprises a register 4000 for temporarily storing the generated information amounts of encoded motion picture signals (to be referred to as encoded signals hereinafter) output from the encoders 1 to 3 and the like, a ROM (Read-Only Memory) 4100 for outputting signals (to be described later) corresponding to the stored contents of the register 4000, ROMs 4200 and 4300 for outputting signals corresponding to the outputs from the ROM 4100, a clock generator 4500 for generating and outputting a clock having a predetermined period and a trigger signal having a period corresponding to an integer multiple of the period of the clock, and a cell counter 4400 for receiving the clock and the trigger signal to generate a cell number and a cell sync signal (both will be described later) and outputting the cell number to the ROMs 4200 and 4300.

The transmission rate allocating circuit 220 comprises an inverter gate 4607 for receiving a cell sync signal, an AND gate 4608 for receiving an output from the inverter gate 4607 and a clock, a plurality of AND gates 4600 to 4602 for respectively receiving outputs from the ROM 4200 and the AND gate 4608, and AND gates 4603 to 4605 for receiving a clock and an output from the ROM 4200.

The generated information amounts of the image channels CH1 to CH3, output from the encoders 1 to 3, are supplied to the register 4000 via the lines 140, 240, and 340, respectively.

The generated information amounts of other image channels, output from other encoders such as the encoders i1 and j1, are also supplied to the register 4000 in the same manner as described above.

The register 4000 stores the generated information amounts supplied from the encoders 1 to 3 in response to a trigger signal supplied from the clock generator 4500 via a line 4501 until the next trigger signal is supplied. The generated information amounts of the respective image channels, stored in the register 4000, are supplied to the ROM 4100 for the respective input image channels CH1 to CH3.

Values representing transmission rates to be allocated to the image channels CH1 to CH3, e.g., the numbers of cells to be output per unit time, are written in the ROM 4100 in accordance with the generated information amounts of the image channels CH1 to CH3. Outputs from the ROM 4100 are supplied to the ROMs 4200 and 4300.

The ROM 4200 outputs gate signals for ON/OFF-controlling read clocks supplied to the encoders 1 to 3 in accordance with the transmission rates of the image channels CH1 to CH3, supplied from the ROM 4100, and cell numbers supplied from the cell counter 4400 via a line 4401.

A table of gate signals for ON/OFF-controlling read clocks is written in the ROM 4200 in advance in accordance with allocated transmission rates, e.g., the numbers of cells allocated per unit time, and cell numbers supplied from the cell counter 4400.

Assume that a transmission rate corresponding to ten cells is allocated to the image channel CH1, as shown in FIGS. 6A to 6G. In this case, as shown in FIG. 6E, in the ROM 4200, a gate signal for turning on the read clocks in FIG. 6F is written in a table area in which the cell numbers in FIG. 6D, supplied from the cell counter 4400, are indicated by addresses 1 to 10. In addition, a gate signal for turning off the read clocks in FIG. 6F is written in a table area in which the cell numbers in FIG. 6D are indicated by addresses 11 or more. FIG. 6A shows clocks from the clock generator 4500. FIG. 6B shows a cell sync signal from the cell counter 4400 for counting the clocks in FIG. 6A. FIG. 6G shows write clocks based on the clocks in FIG. 6A. Data is read out from an encoder in accordance with the clocks indicated by "X" in FIG. 6F; cell numbers are written in accordance with the clocks indicated by "Y" in FIG. 6G; and data output from an encoder is written in accordance with the clocks indicated by "Z" in FIG. 6G. The read clocks indicated by "X" and the write clocks indicated by "Z" are synchronously output.

Of the outputs from the ROM 4200 shown in FIG. 4, a gate signal for a read clock for the image channel CH1 is supplied to the AND gates 4600 and 4603 via the line 4201.

Of the outputs from the ROM 4200, a gate signal for a read clock for the image channel CH2 is supplied to the AND gates 4601 and 4604 via the line 4202. Of the outputs from the ROM 4200, a gate signal for a read clock for the image channel CH3 is supplied to the AND gates 4602 and 4605 via the line 4203.

The AND gate 4600 calculates the logical AND of the gate signal supplied from the ROM 4200 via the line 4201 and a gate clock supplied from the AND gate 4608, thus generating a read clock.

Similar to the AND gate 4600, the AND gate 4601 calculates the logical AND of the gate signal supplied from the ROM 4200 via the line 4202 and a gate clock supplied from the AND gate 4608, thus generating a read clock. The AND gate 4601 outputs the read clock to the line 420.

The AND gate 4602 also calculates the logical AND of the gate signal supplied from the ROM 4200 via the line 4203 and a gate clock supplied from the AND gate 4608, thus generating a read clock.

The read signal for the image channel CH1, output from the AND gate 4600, is supplied to the encoder 1 via the line 410. The read signal for the image channel CH2, output from the AND gate 4601, is supplied to the encoder 2 via the line 420. Similarly, the read signal for the image channel CH3, output from the AND gate 4602, is supplied to the encoder 3 via the line 430.

Note that the clock generator 4500 generates read and write clocks and the clocks shown in FIG. 6A on which the count value of the cell counter 4400 is based, and supplies the clocks to the cell counter 4400 and the AND gates 4603, 4604, 4605, and 4608 via a line 4502. The clock generator 4500 generates trigger signals for storing generated information amounts supplied from the respective encoders in the register 4000 at predetermined time intervals, and supplies them to the register 4000 via the line 4501.

The trigger signals generated by the clock generator 4500 are also supplied to the cell counter 4400 and the multiplex circuit 210 via the line 4501.

Note that, as shown in FIG. 7B, the period of the above-mentioned trigger signal is set to be a proper period corresponding to an integer multiple of the period of the cell sync signal shown in FIG. 7A, output from the cell counter 4400.

The cell counter 4400 generates a cell number with reference to clocks from the clock generator 4500. Since each cell is constituted by a plurality of bit strings, the cell counter 4400 updates the cell number every time clocks corresponding to the plurality of bit strings are supplied. In addition, the cell counter 4400 generates the cell sync signal shown in FIGS. 6B and 7A and indicating the limits of cells. A cell number generated by the cell counter 4400 is supplied to the ROMs 4200 and 4300 via the line 4401. A cell sync signal generated by the cell counter 4400 is supplied to the inverter gate 4607 and the multiplex circuit 210 via the line 4402.

The inverter gate 4607 inverts this cell sync signal and supplies it to the AND gate 4608. The AND gate 4608 calculates the logical AND of the output from the inverter gate 4607 and the clock supplied from the clock generator 4500 to generate the gate clock shown in FIG. 6C. The gate clock is supplied to the AND gates 4600, 4601, and 4602.

The AND gate 4603 calculates the logical AND of the gate signal supplied from the ROM 4200 via a line 4201 and the clock supplied from the clock generator 4500 to generate a write clock, and supplies it to the multiplex circuit 210 via the line 404.

The AND gate 4604 calculates the logical AND of the gate signal supplied from the ROM 4200 via a line 4202 and the above-mentioned clock to generate a write clock, and supplies it to the multiplex circuit 210 via a line 405.

Similarly, the AND gate 4605 calculates the logical AND of the gate signal supplied via a line 4203 and the clock supplied via the line 4502 to generate a write lock, and supplies it to the multiplex circuit 210 via a line 406.

Meanwhile, the ROM 4300 generates a switching signal for multiplexing cells of an image channel with a large generated information amount with respect to a transmission channel corresponding to an image channel with a small generated information amount in accordance with a transmission rate supplied from the ROM 4100 and represented by the number of cells to be transmitted per unit time for each image channel and each cell number supplied via the line 4401.

Note that a table for generating a multiplex switching signal in accordance with the number of cells to be transmitted per unit time for each image channel, which information is externally input, and each cell number supplied from the external cell counter 4400, is stored in the ROM 4300 in advance.

A switching signal output from the ROM 4300 is supplied to the multiplex circuit 210 via lines 401, 402, and 403.

The multiplex circuit 210 will be described next with reference to FIG. 5. The multiplex circuit 210 comprises header generators 4700, 4710, and 4720, header multiplex switches 4730, 4740, and 4750, and transmission channel multiplex switches 4760, 4770, and 4780. Each of the header generators 4700, 4710, and 4720 outputs a header in response to a cell sync signal from the transmission rate allocating circuit 220. The header multiplex switches 4730, 4740, and 4750 respectively receive the headers from the header generators 4700, 4710, and 4720 and encoded data corresponding to the image channels CH1 to CH3. Each of the header multiplex switches 4730, 4740, and 4750 then selects and outputs either the encoded data or the header. The transmission channel multiplex switches 4760, 4770, and 4780 respectively receive outputs from the header multiplex switches 4730, 4740, and 4750.

The multiplex circuit 210 also includes write clock switches 4790, 4800, and 4810 for receiving write clocks output from the transmission rate allocating circuit 220, and FIFOs (First-In First-Out memories) 4820, 4830, and 4840 for respectively receiving outputs from the transmission channel multiplex switches 4760, 4770, and 4780. The switching apparitions of the FIFOs 4820, 4830, and 4840 are controlled by outputs from the write clock switches 4790, 4800, and 4810.

The header generator 4700 generates an image channel number and a cell number constituting a header for identifying a cell consisting of a plurality of bit strings. The header generator 4700 resets the cell number in response to a trigger signal supplied via the line 4501, and updates/outputs the cell number of the image channel CH1 in response to a cell sync signal supplied via the line 4402.

The identification header of the image channel CH1, output from the header generator 4700, is supplied to one input terminal of the header multiplex switch 4730.

Similar to the header generator 4700, the header generator 4710 generates an image channel number and a cell number. That is, the header generator 4710 resets the cell number in response to a trigger signal supplied via the line 4501 and updates the cell number of the image channel CH2 in response to a cell sync signal supplied via the line 4402. The identification header of image channel CH2, output from the header generator 4710, is supplied to one input terminal of the header multiplex switch 4740.

Similar to the header generator 4700, the header generator 4720 resets the cell number in response to a trigger signal supplied via the line 4501 and updates the cell number of the image channel CH3 in response to a cell sync signal supplied via the line 4402, thereby outputting an image channel number and a cell number. The identification header of the image channel CH3, output from the header generator 4720, is supplied to one input terminal of the header multiplex switch 4750.

Encoded data is supplied from the encoder 1 to the other input terminal of the header multiplex switch 4730 via the line 141. Encode data is supplied from the encoder 2 to the other input terminal of the header multiplex switch 4740 via the line 241. Similarly, encoded data is supplied from the encoder 3 to the other input terminal of the header multiplex switch 4750 via the line 341.

The header multiplex switches 4730, 4740, and 4750 respectively switch and multiplex the headers supplied from the header generators 4700, 4710, and 4720 and the encoded data supplied from the encoders 1, 2, and 3 in response to cell sync signals supplied via the line 4402.

The header multiplex switches 4730, 4740, and 4750 select the headers while the cell sync signal is at high level ("1") in FIG. 6B, and also select the encoded data while the cell sync signal is at low level ("0"), thereby adding the identification headers to the encoded data and outputting them as cells.

Note that each of the transmission channel multiplex switches 4760, 4770, and 4780 has first to third input portions, sequentially located downward in FIG. 5.

An output from the header multiplex switch 4730 is supplied to the second input portion of the transmission channel multiplex switch 4760 and the first input portion of the transmission channel multiplex switch 4770.

An output from the header multiplex switch 4740 is supplied to the third input portion of the transmission channel multiplex switch 4760, the second input portion of the transmission channel multiplex switch 4770, and the first input portion of the transmission channel multiplex switch 4780.

An output from the header multiplex switch 4750 is supplied to the third input portion of the transmission channel multiplex switch 4770 and the second input portion of the transmission channel multiplex switch 4780.

The transmission channel multiplex switch 4760 selects a cell to be transmitted through the transmission channel A in accordance with a switching signal supplied via the line 401, and supplies it to the FIFO 4820. The transmission channel multiplex switch 4770 selects a cell to be transmitted through the transmission channel B in accordance with a switching signal supplied via the line 402, and supplies it to the FIFO 4830. Similarly, the transmission channel multiplex switch 4780 selects a cell to be transmitted through the transmission channel C in accordance with a switching signal supplied via the line 403, and supplies it to the FIFO 4840.

Each of the write clock switches 4790, 4800, and 4810 has first to fourth input portions, sequentially located downward in FIG. 5.

A low-level "0" signal is always supplied to the fourth input portion of each of the write clock switches 4790, 4800, and 4810. In addition, write clocks are supplied to the second input portions of the write clock switches 4790, 4800, and 4810 via the lines 404, 405, and 406, respectively.

In this case, the write clock supplied via the line 404 is used for the image channel CH1; the write clock supplied via the line 405 is used for the image channel CH2; and the write clock supplied via the line 406 is used for the image channel CH3.

The line 404 is also connected to the first input portion of the write clock switch 4800; the line 405 is also connected to the third input portion of the write clock switch 4790; and the line 406 is also connected to the third input portion of the write clock switch 4800.

In addition to the above-mentioned write clocks, write clocks for other different image channels (not shown) are input to the first input portion of the write clock switch 4790 and the third input portion of the write clock switch 4810.

The write clock switch 4790 selects one of the signals input to the first to fourth input portions in accordance with a switching signal supplied via the line 401, and supplies the selected signal to the FIFO 4820.

The write clock switch 4800 selects one of the signals input to the first to fourth input portions in accordance with a switching signal supplied via the line 402, and supplies the selected signal to the FIFO 4830.

Similarly, the write clock switch 4810 selects one write clock in accordance with a switching signal supplied via the line 403, and supplies the selected signal to the FIFO 4840.

Figures 8A, 8B, 8C:
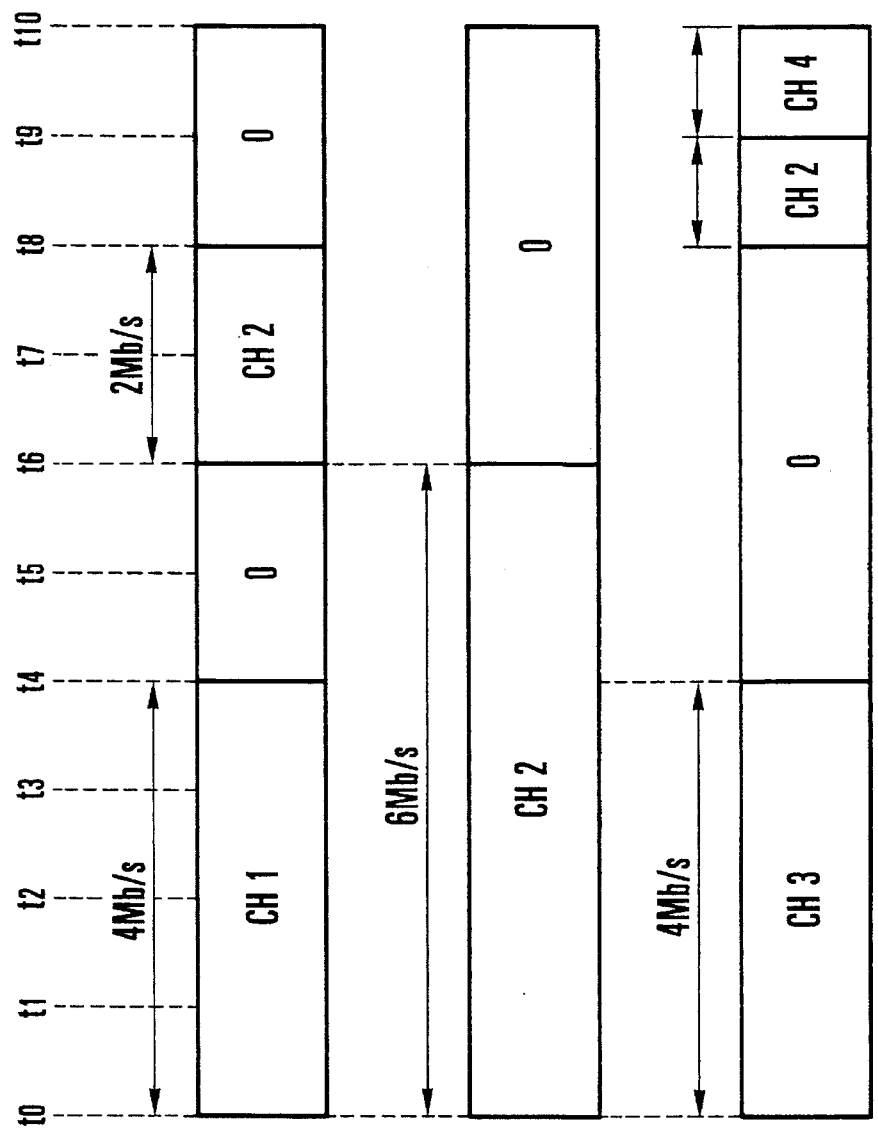
FIGS. 8A to 8C are charts for explaining an operation of the multiplex circuit 210 in FIG. 5.

FIGS. 8A to 8C show an operation of the multiplex circuit 210 in FIG. 5.

Assume that at a certain time, 5 Mb/s is allocated to the image channel CH0 (not shown) adjacent to the information of the image channel CH1 in FIG. 1; 5 Mb/s, the image channel CH1; 9 Mb/s, the image channel CH2; 4 Mb/s, the image channel CH3; and 8 Mb/s, the image channel CH4 (not shown) located immediately below the image channel CH3 in FIG. 1. Also assume that each of the transmission channels A to C is only capable of transmitting a maximum of 6-Mb/s data in the time interval between time t0 to time t10 shown in FIGS. 8A to 8C.

A switching signal for the transmission channel multiplex switch 4760 and the write clock switch 4790 for the transmission channel A will be described first. The ROM 4300 supplies the following switching signals to the transmission channel multiplex switch 4760 via the line 401 in the following time intervals: a signal for selecting the signal of the image channel CH1, supplied from the header multiplex switch 4730, in the time interval between time t0 and time t4 in the transmission channel A in FIG. 8A; a switching signal for selecting transmission of no image data (indicated by "0" in FIG. 8A) in the time interval between time t4 and time t6; a switching signal for selecting the signal of the image channel CH2, supplied from the header multiplex switch 4740, in the time interval between time t6 and time t8; and a switching signal for selecting transmission of no image data in the time interval between time t8 and time t10.

In addition, the ROM 4300 supplies the following switching signals to the write clock switch 4790 in the following time intervals: a switching signal for selecting/outputting a write signal for the image channel CH1, supplied via the line 404, in the time interval between time t0 and time t4; a switching signal for selecting a signal ("0" level) from the fourth input portion of the write clock switch 4790 in the time intervals between time t4 and time t6 and between time t8 and time t10; and a switching signal for selecting a write signal for the image channel CH2, supplied via the line 405, in the time interval between time t6 and time t8.

In the time interval between time t0 and time t6 in the transmission channel B shown in FIG. 8B, the ROM 4300 supplies a switching signal for selecting the signal of the image channel CH2, supplied from the header multiplex switch 4740, to the transmission channel multiplex switch 4770 via the line 402. In addition, the ROM 4300 supplies the following switching signals to the write clock switch 4800 via the line 402 in the following time intervals: a switching signal for selecting a write signal for the image channel CH2, supplied via the line 405, and outputting the sinal from the write clock switch 4800 to the FIFO 4830 in the time interval between time t0 and time t6; and a switching signal for inhibiting the transmission channel multiplex switch 4770 from outputting image data, selecting an output from the fourth input portion of the write clock switch 4800, and selecting an input to be supplied to the FIFO 4830 in the time interval between time t6 and time t10.

The ROM 4300 supplies the following switching signals to the transmission channel multiplex switch 4780 via the line 403 in the following time intervals: a switching signal for selecting the signal of the image channel CH3, supplied from the header multiplex switch 4750, in the time interval between time t0 and time t4 in the transmission channel C in FIG. 8C; a switching signal for selecting transmission of no image data in the time interval between time t4 and time t8; a switching signal for selecting the signal of the image channel CH2, supplied from the header multiplex switch 4740, in the time interval between time t8 and time t9; and a switching signal for selecting the signal of the image channel CH4 and supplying it to the FIFO 4840 in the time interval between time t9 and time t10.

Furthermore, the ROM 4300 supplies the following switching signals to the write clock switch 4810 in the following time intervals: a switching signal for selecting a write signal for the image channel CH3, supplied via the line 406 in the time interval between time t0 and time t4; a switching signal for selecting an input from the fourth input portion of the write clock switch 4810 in the time interval between time t4 and time t8; a switching signal for selecting a write signal for the image channel CH2, supplied via the line 405, in the time interval between time t8 and time t9; and a switching signal for selecting a write signal for the image channel CH4 in the time interval between time t9 and time t10.

As described above, switching control is performed by setting a switch table corresponding to the transmission rates of the respective image channels and writing the table in the ROM 4300 in advance.

The FIFO 4820 shown in FIG. 5 writes each cell supplied from the transmission channel multiplex switch 4760 in accordance with a write clock supplied from the write clock switch 4790. Similarly, the FIFO 4830 writes each cell supplied from the transmission channel multiplex switch 4770 in accordance with a read clock supplied from the write clock switch 4800. The FIFO 4840 writes each cell supplied from the transmission channel multiplex switch 4780 in accordance with a read clock supplied from the write clock switch 4810.

The FIFO 4820 reads out stored data in accordance with a transmission line clock supplied from the transmitter 31 via the line 451, and supplies the data to the transmitter 31 via the line 450. Similarly, the FIFO 4830 reads out stored data in accordance with a transmission line clock supplied from the transmitter 32 via the line 461, and supplies the data to the transmitter 32 via the line 460. The FIFO 4840 reads out stored data in accordance with a transmission line clock supplied from the transmitter 33 via the line 471, and supplies the data to the transmitter 33 via the line 470.

Note that the multiplex circuit 210 includes header generators equal in number to the image channels in addition to the header generators 4700, 4710, and 4720, and also includes header multiplex switches equal in number to the header generators in addition to the header multiplex switches 4730, 4740, and 4750.

In addition, the multiplex circuit 210 includes transmission channel multiplex switches, each identical to the transmission channel multiplex switch 4760, which are equal in number to the image channels, and also includes FIFOs, each identical to the FIFO 4820, which are equal in number to the image channels.

Figure 9:
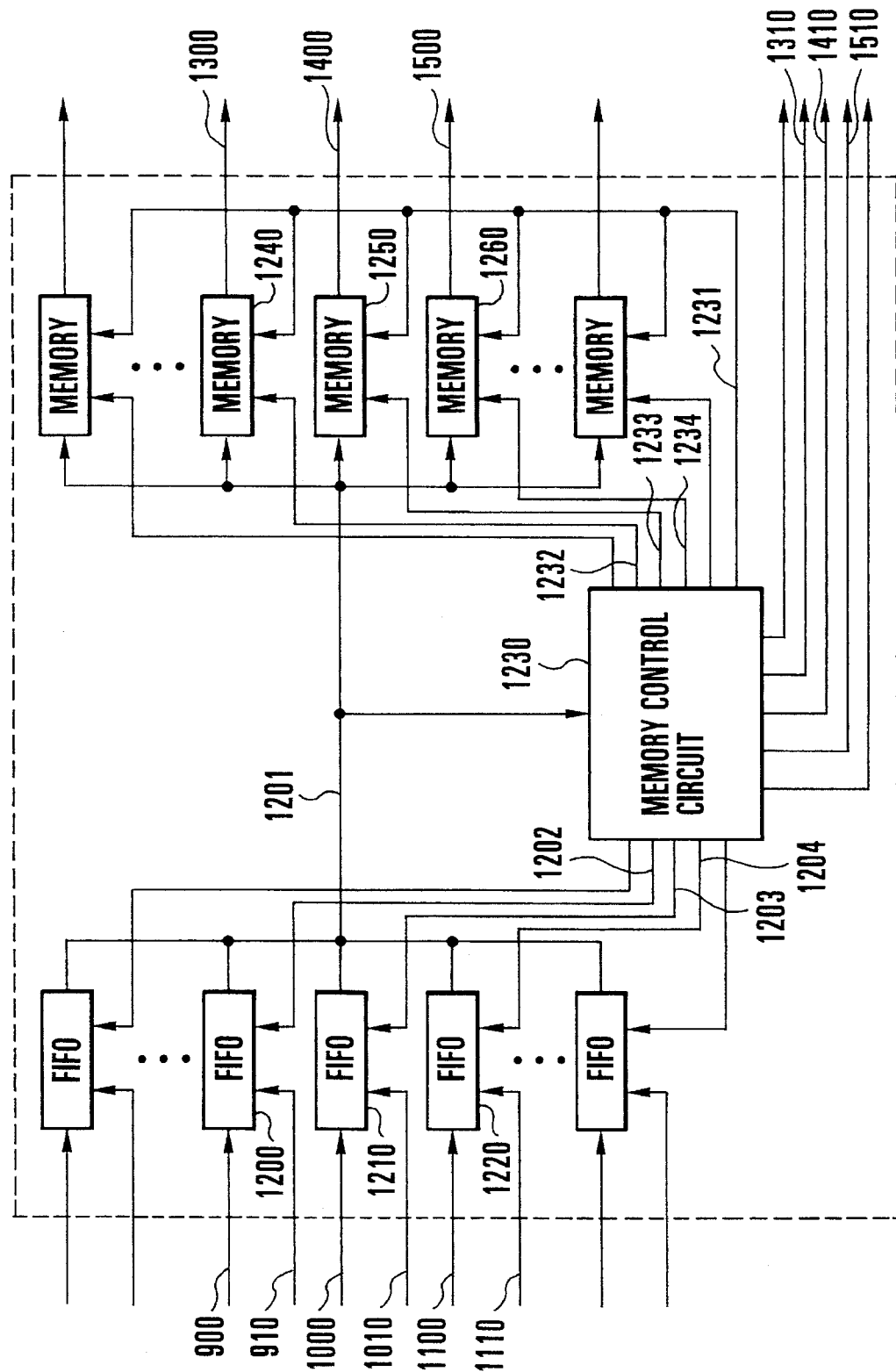
FIG. 9 is a block diagram showing a variable rate separator 60 in FIG. 1.

FIG. 9 shows the arrangement of the variable rate separator 60 in FIG. 1.

The variable rate separator 60 will be described below with reference to FIG. 9.

The variable rate separator 60 shown in FIG. 9 comprises FIFOs 1200, 1210, and 1220 for respectively receiving outputs from the receivers 51 to 53 shown in FIG. 1, memories 1240, 1250, and 1260 for storing outputs from the FIFOs 1200, 1210, and 1220 and the like, and a memory control circuit 1230 for controlling the FIFOs 1200, 1210, and 1220, the memories 1240, 1250, and 1260, and the like.

The FIFO 1200 writes data supplied from the receiver 51 via a line 900 in accordance with a transmission line clock supplied from the receiver 51 via a line 910, and temporarily stores the data.

The FIFO 1210 writes data supplied from the receiver 52 via a line 1000 in accordance with a transmission line clock supplied from the receiver 52 via a line 1010, and temporarily stores the data. Similarly, the FIFO 1220 writes data supplied from the receiver 53 via a line 1100 in accordance with a transmission line clock supplied from the receiver 53 via a line 1110, and temporarily stores the data.

The FIFOs 1200, 1210, and 1220 respectively output the stored data in accordance with read cocks supplied from the memory control circuit 1230 via lines 1202, 1203, and 1204.

The data read out from the FIFOs 1200, 1210, and 1220 are supplied to the memory control circuit 1230 and the memories 1240, 1250, and 1260 via the line 1201.

The memory control circuit 1230 monitors the header of each cell supplied via the line 1201, and detects the number of the image channels CH1 to CH3 and cell numbers. The memory control circuit 1230 generates memory write addresses and write signals in accordance with the detected number of the image channels CH1 to CH3 and the detected cell numbers, and independently controls the memories 1240, 1250, and 1260 to write the corresponding data therein, respectively.

At this time, the memory control circuit 1230 arranges only encoded data, from which the headers are removed, in the corresponding memories in the order of the cell numbers, thereby causing the memories 1240, 1250, and 1260 to perform write operations.

The memory control circuit 1230 supplies write and read addresses to the memories 1240, 1250, and 1260 via the line 1231. The memory control circuit 1230 supplies write signals to the memories 1240, 1250, and 1260 via the lines 1232, 1233, and 1234, respectively. In addition, the memory control circuit 1230 outputs data write clocks to the decoders 71 to 73.

The memory control circuit 1230 supplies the data write clocks to the decoders 71 to 73 via lines 1310, 1410, and 1510, respectively. The memory 1240 writes data supplied via the line 1201 at an address designated by the address signal supplied from the memory control circuit 1230 via a line 1231 in accordance with a write signal supplied via a line 1232.

Similarly, the memory 1250 writes data supplied via the line 1201 at an address designated by the address signal supplied from the memory control circuit 1230 via the line 1231 in accordance with a write signal supplied via a line 1233. The memory 1260 writes data supplied via the line 1201 at an address designated by the address signal supplied from the memory control circuit 1230 via the line 1231 in accordance with a write signal supplied via a line 1234.

The memories 1240, 1250, and 1260 respectively read out data from addresses designated by the address signals supplied via the line 1231 and output the read data outside in a time interval during which no write signals are supplied.

More specifically, the data read out from the memories 1240, 1250, and 1260 are supplied to the decoders 71, 72, and 73 via lines 1300, 1400, and 1500, respectively.

FIGS. 10A to 10D show the relationship between read clocks for the FIFOs 1200, 1210, and 1220 and a cell sync signal.

Figure 10:
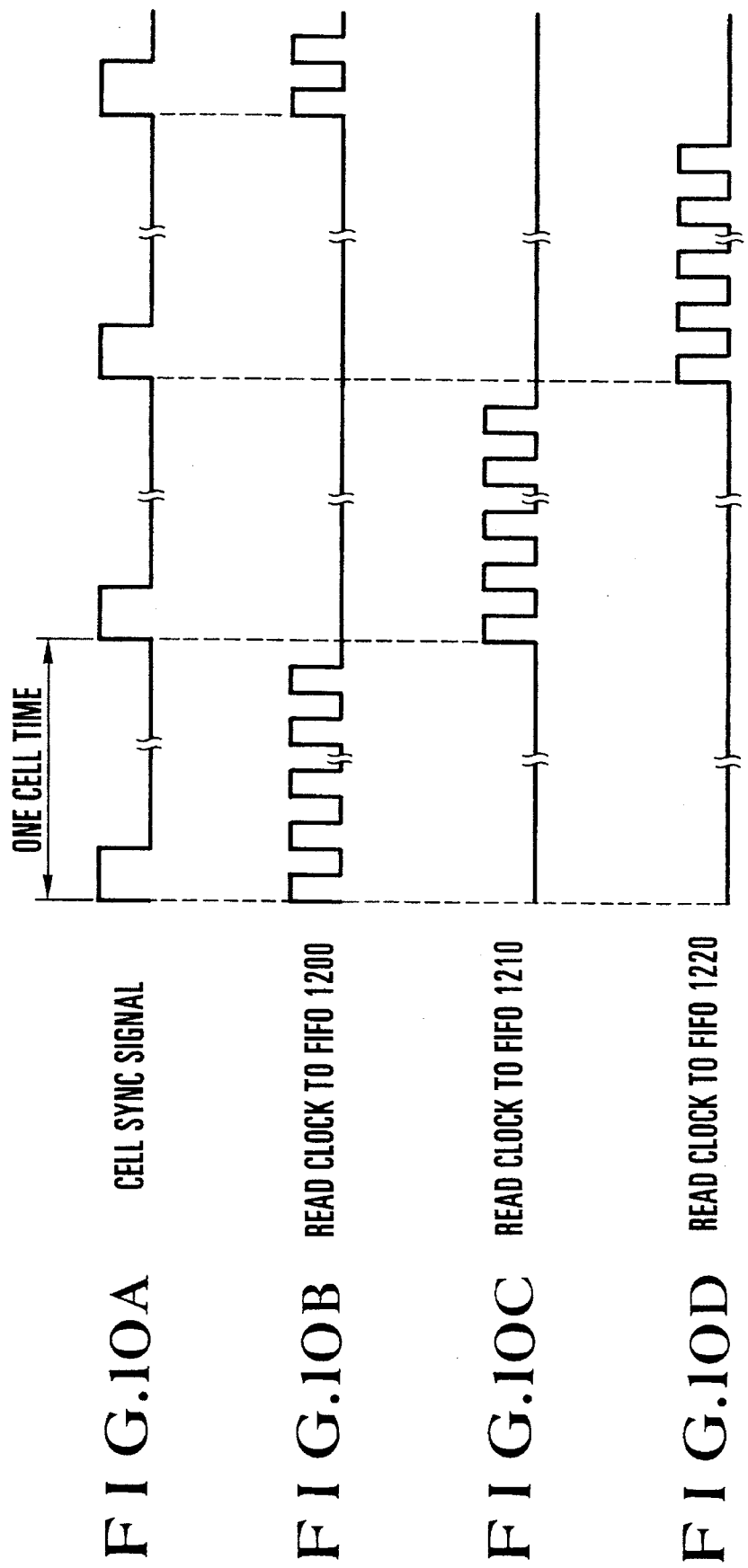
FIGS. 10A to 10D are timing charts showing the relationship between the cell sync signal and read clocks from FIFOs 1200, 1210, and 1220 in FIG. 9.

The memory control circuit 1230 continuously supplies read clocks to the FIFOs 1200, 1210, and 1220 of the respective transmission channels at cell-time intervals in accordance with the cell sync signal shown in FIG. 10A. For example, the memory control circuit 1230 supplies the read clock shown in FIG. 10B to the FIFO 1200 for one cell time starting from a certain time; supplies the read clock shown in FIG. 10C to the FIFO 1210 for one cell time starting from the next time; and supplies the read clock shown in FIG. 10D to the FIFO 1220 for one cell time starting from the next time.

The FIFOs 1200, 1210, and 1220 sequentially read out data in units of cells in accordance with the read clocks respectively received. In the above description, the image channel CH2 is regarded as a channel of interest, exemplifying the case wherein when the generated information amount of the image channel CH2 becomes large, image data of the channel are distributed to two adjacent transmission channels, and hence the image data are distributed to a maximum of three channels (n=3), i.e., adaptive multiplexing is performed among a total of three channels. However, the above description essentially applies to a case wherein a different channel is regarded as a channel of interest or the value n is set to be different from the above value.

Referring to FIG. 9, in addition to the FIFOs 1200, 1210, and 1220, the apparatus includes two or more FIFOs which perform the same operations as those described above. In addition to the memories 1240, 1250, and 1260, two or more memories are connected to the memory control circuit 1230, and the memory control circuit 1230 performs the same control as that described above with respect to these FIFOs and memories.

Note that the transmission channels A to C and the like shown in FIG. 1 have different carrier frequencies. For example, higher carrier frequencies are sequentially set from the uppermost transmission channel to the lowermost transmission channel.

If the image channel CHi is regarded as a channel of interest, adaptive multiplexing is performed with respect to the uppermost transmission channel shown in FIG. 1 and a transmission channel having a carrier frequency higher than that of the uppermost transmission channel. If the image channel CHj is regarded as a channel of interest, adaptive multiplexing may be performed between a transmission channel having the highest carrier frequency and a transmission channel having a lower carrier frequency.

In addition, the above-described adaptive multiplexing may not be performed with respect to all the image channels CHi to CHj, and the maximum number of allowable image channels, of the image channels CHi to CHj, for which adaptive multiplexing is performed, may be designated by properly setting the variable rate multiplexer 20 and the variable rate separator 60. In addition, adaptive multiplexing may be performed with respect to only two or more specific image channels.

Figure 11:
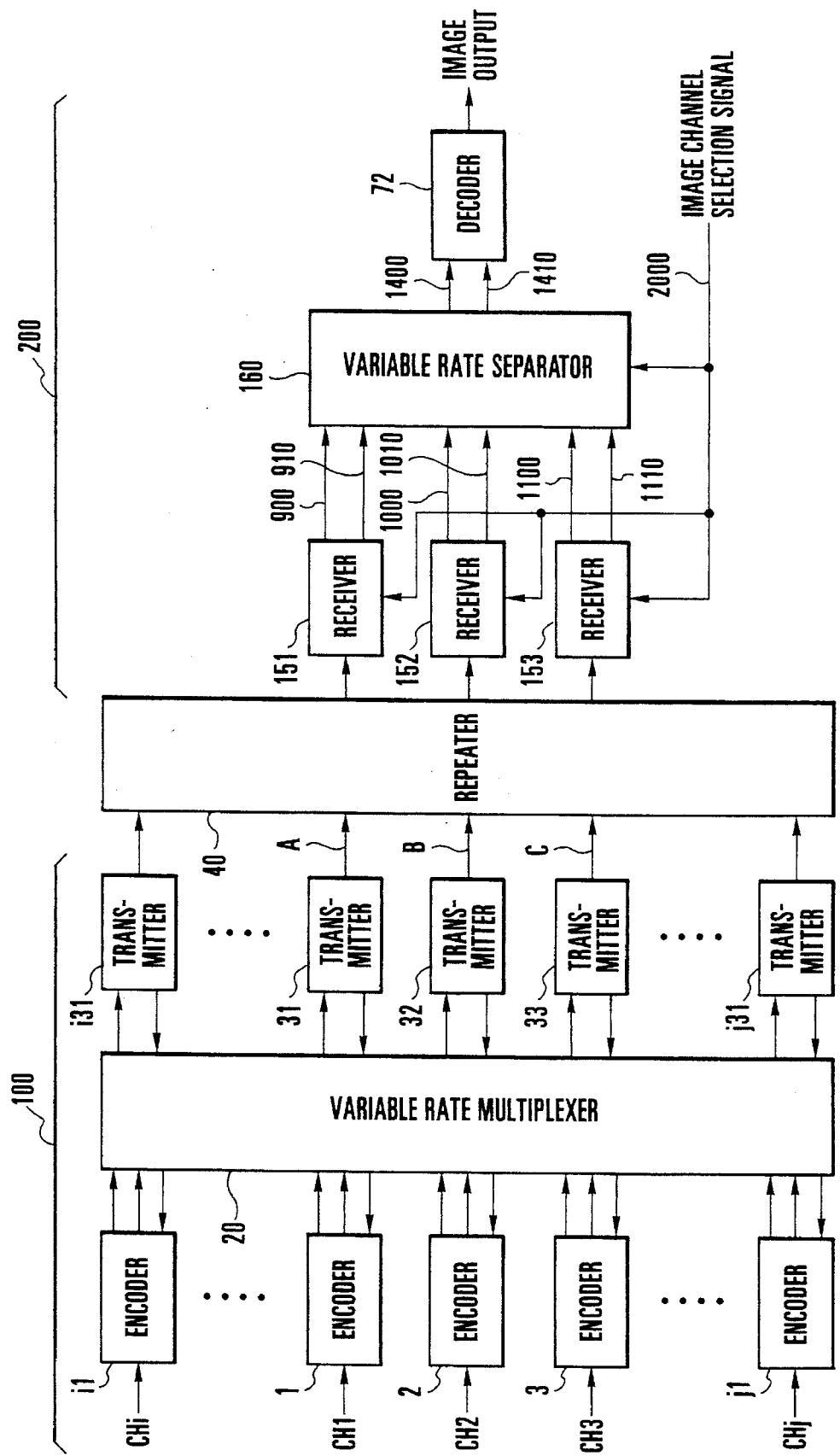
FIG. 11 is a block diagram showing another embodiment of the present invention.
Figure 12:
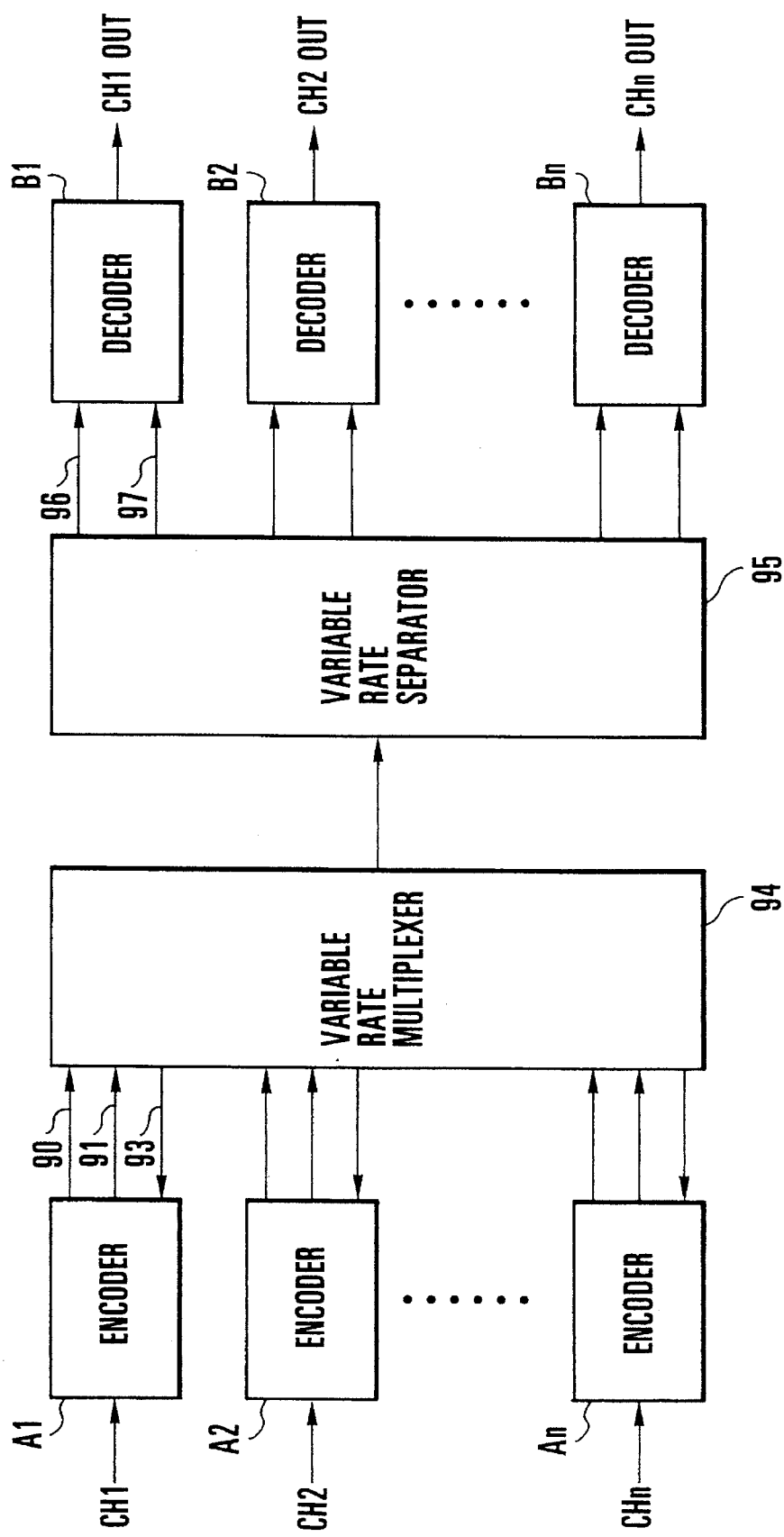
FIG. 12 is a block diagram showing a conventional multiplex transmission apparatus for motion picture signals.

FIG. 11 shows another embodiment of the present invention. The multiplex transmission apparatus for motion picture signals, shown in FIG. 11, will be described below.

Referring to FIG. 11, encoders i1 to 1, 2, and 3 to j1, a variable rate multiplexer 20, transmitters i31 to 31, 32, and 33 to j31, and a repeater 40 have the same arrangements as those shown in FIG. 1, and hence a description thereof will be omitted.

This apparatus includes three receivers 151 to 153, each having the same characteristics as those of the receiver shown in FIG. 1. A variable rate separator 160 operates for only transmission channels A to C. As a decoder, only a decoder identical to the decoder 72 shown in FIG. 1 is connected to the variable rate separator 160.

This arrangement is employed because in some case, decoding is required with respect to only one specific channel on the receiving end. In this case, an image channel CH2 is regarded as a specific channel subjected to decoding, exemplifying the multiplex transmission apparatus for n=3.

In this case, the receivers 151 to 153 corresponding to three channels are sufficient. An image channel selection signal 2000 is externally supplied to these receivers 151 to 153 via a line 2000 to instruct each receiver to select a transmission channel through which encoded data of an image channel to be selected is transmitted. That is, the signal 2000 instructs the receivers 151 to 153 to select image channels CH1 to CH3, respectively. At this time, outputs from these receivers are encoded data included in the transmission channels A, B, and C shown in FIG. 2, and include data other than the data of the image channel CH2.

Since an image channel selection signal supplied via the line 2000 indicates the image channel CH2, the variable rate separator 160 removes data other than the data of the image channel CH2, and arranges/supplies only the encoded data corresponding to the image channel CH2 to the decoder 72 via a line 1400, thus obtaining a motion picture signal after decoding. The same operation as that described above is performed when another image channel is selected to perform a decoding operation.

As is apparent, in the multiplex transmission apparatus shown in FIG. 1, when signals output from the transmitters can be satisfactorily received at the receiving end, the repeater can be omitted.

In encoding/transmitting motion picture signals of a plurality of channels, for example, in a satellite communication system, the present invention can be applied to a plurality of transmission channels, in which each carrier of the well known SCPC scheme is transmitted in correspondence with an encoded image channel. In addition, the present invention can be applied to a transmission system in which a carrier is allocated to each image channel, as in a satellite broadcast. Similarly, the present invention may be applied to a system in which a carrier is allocated to each channel, and images of a large number of channels are transmitted at once, as in a CATV system.

In any case, however, digital transmission is performed by using a proper modulation scheme while using each carrier. Although no specific limitations are imposed on a modulation scheme, it is obvious that a highly efficient modulation scheme is preferable. The present invention is based on the fact that the generated information amount of each image channel greatly varies every moment, and input motion picture signals in different channels are generally independent of each other and have no correlation. That is, motion picture signals are encoded and transmitted by adaptively allocating transmission rates, within the range of a total transmission capacity of prepared transmission channels, in accordance with the generated information amount of each image channel.

As has been described above, the multiplex transmission apparatus for motion picture signals according to the present invention is based on the fact that the respective channels are generally independent of each other and have no correlation. That is, motion picture signals of a plurality of channels are encoded and transmitted by allocating transmission rates to image channels in accordance with the generated information amounts of the respective image channels within the range of a total transmission rate of a plurality of transmission channels. Data of an image channel to which a high transmission rate is allocated is distributed to the transmission channel of an image channel to which a low transmission rate is allocated, and the data are transmitted at the transmission rates of the respective transmission channels. With this operation, even if the generated information amount of encoded data in a given image channel at a given time is large, part of the transmission rate of another image channel with a small encoded information amount can be used, thereby greatly reducing a deterioration in image quality which is caused when the encoded information amount is suppressed by performing an encoding operation using coarse encoding parameters or stopping an encoding operation without distributing such excess encoded information to other transmission channels. In some case, only data transmitted through a small number of image channels, of all the data transmitted through a large number of image channels, need to be received at the receiving end, while a multiplex effect is used, upon distributing information of a given image channel to transmission channels located on both sides of the transmission channel of the given image channel and having adjacent carrier frequencies by performing above-described distribution of image data to transmission channels. In this case, only receivers necessary for multiplexing of desired image channels and corresponding variable rate separator and decoder need to be used instead of using receivers equal in number to transmitted image channels and a corresponding variable rate separator. Therefore, the apparatus arrangement at the receiving end is small and economical as compared with a conventional apparatus of this type. According to the adaptive multiplex scheme of the present invention, when a relatively large receiving apparatus can be used, as in the case of the head-end of a CATV system, encoded data of all multiplexed channels can be decoded. In contrast to this, when encoded data is to be directly received in a home, a compact receiving apparatus is generally required. In this case, since data of only a desired image channel and adjacent channels need to be adaptively separated and decoded, a small receiving apparatus can be used. In this manner, multiplexed image signals can be received regardless of the size of a receiving apparatus, thus providing great practical effects.

What is claimed is:

1. A multiplex transmission method for motion picture signals, comprising the steps of:

preparing a transmission line constituted by a plurality of transmission channels having different carrier frequencies, one of the transmission channels having a transmission rate substantially equal to a long-term average of information generation speeds in encoding an arbitrary motion picture signal;

encoding the input motion picture signal by using inter-frame and intra-frame correlations;

relating the image channels in one-to-one correspondence with the transmission channels having the different carrier frequencies;

outputting encoded information for each image channel and a generated information amount representing a generation speed of the encoded information;

when an image channel of interest of the image channels exhibits a generated information amount, which represents the encoded information generation speed within a time interval, exceeding a predetermined transmission rate of said transmission line, performing adaptive multiplexing by designating output rates of the encoded information, supplying read clocks corresponding to the output rates, forming cells consisting of a plurality of bit strings of the encoded information, adding identification information indicating a relationship with the image channel to said cells, and, when at least one image channel of interest exhibits the generated information amount exceeding the predetermined transmission rate, dividing and distributing the cells of the image channel of interest to the transmission channels including the transmission channel of the image channel of interest; and transmitting the cells divided/distributed by the adaptive multiplexing for each allocated transmission channel.

2. A method according to claim 1, wherein the transmission channels allocated by the adaptive multiplexing are selected such that carrier frequencies are adjacent to the image channel of interest.

3. A method according to claim 1, wherein when the image channel of interest has a lowest carrier frequency, the adaptive multiplexing is performed with respect to the transmission channel having an adjacent carrier frequency on a higher frequency side.

4. A method according to claim 1, wherein when the image channel of interest has a highest carrier frequency, the adaptive multiplexing is performed with respect to the transmission channel having an adjacent carrier frequency on a lower frequency side.

5. A method according to claim 1, wherein a maximum allowable number of image channels of interest is set in advance, and the encoded information is distributed to the image channels of interest within the set maximum allowable number.

6. A method according to claim 1, wherein at least one of the image channels is set in advance as the image channel of interest, and the encoded information is distributed to only the set image channel.

7. A method according to claim 1, wherein said transmission line is constituted by m (m: an integer larger than 3) transmission channels, and the encoded information is distributed to n (m≧n≧2) transmission channels by the adaptive multiplexing.

8. A method according to claim 1, wherein the generated information amount is an occupation amount of a memory in which the encoded information is temporarily stored upon encoding.

9. A method according to claim 1, wherein the transmission rate of the transmission channel is the number of cells of the encoded information which are transmitted per unit time.

10. A method according to claim 1, further comprising the steps of:

selecting transmission channels so that they are in one-to-one correspondence with a plurality of receiving means;

removing information other than the information of the image channel of interest;

arranging/supplying only the information corresponding to the image channel of interest;

decoding the information corresponding to the image channel of interest.

11. A multiplex transmission apparatus for motion picture signals, comprising:

a transmission line constituted by a plurality of transmission channels having different carrier frequencies, one of the transmission channels having a transmission rate substantially equal to a long-term average of information generation speeds in encoding an arbitrary motion picture signal;

a plurality of encoding means, arranged for the respective image channels, for encoding the input motion picture signal by using inter-frame and intra-frame correlations and outputting encoded information, each of said encoding means having a buffer memory for interfacing with said transmission line to temporarily store the encoded information and output at a designated rate, and outputting a generated information amount representing a generation speed of the encoded information;

variable rate multiplex means for designating an output rate of the encoded information with respect to each of said encoding means in accordance with the generated information amount output from said encoding means, supplying read clocks corresponding to the output rates to the encoding means, forming cells consisting of a plurality of bit strings of the encoded information, adding identification information indicating a relationship with the image channel to said cells output from each of said encoding means, and for, when at least one image channel of interest exhibits the generated information amount exceeding the predetermined transmission rate, dividing and distributing the cells of the image channel of interest to at least two transmission channels of the transmission channels, and outputting the cells for each transmission channel; and a plurality of transmitting means for receiving the cells of the respective transmission channels from said variable rate multiplex means and outputting, at said designated output rate, signals caused to correspond to the respective transmission channels by using a predetermined modulation scheme.

12. An apparatus according to claim 11, further comprising:

a plurality of receiving means for respectively receiving and decoding outputs from said transmitting means;

variable rate separating means for receiving outputs from said receiving means, separating/grouping the outputs in units of the encoded information having the same identification information, and outputting the encoded information for the respective image channels at allocated rates; and a plurality of decoding means for temporarily storing the encoded information output from said variable rate separating means for the respective image channels in rate matching buffer memories at respective allocated rates, and decoding outputs from the buffer memories into the motion picture signals by using a predetermined decoding scheme.

13. An apparatus according to claim 12, wherein when the generated information amount of the image channel of interest exceeds the predetermined transmission rate, said variable rate multiplexing means distributes the encoded information of the image channel of interest to a predesignated specific transmission channel of the transmission channels, and outputs the information for each transmission channel, and said receiving means is arranged in correspondence with only the specific transmission channel to receive an output from said transmitting means in the specific transmission channel.

14. An apparatus according to claim 10, further comprising:

a plurality of receiving means for respectively receiving and decoding outputs from said transmitting means;

an image channel selection signal supplied to said plurality of receiving means for instructing each of said receiving means to select a respective transmission channel;

variable rate separating means for receiving outputs from said receiving means, removing information other than the information of the image channel of interest, arranging/supplying only the encoded information corresponding to the image channel of interest; and a decoding means for decoding the output from the variable rate separating means into the motion picture signal by using a predetermined decoding scheme.

15. A multiplex transmission apparatus for motion picture signals, comprising:

a transmission line constituted by a plurality of transmission channels having different carrier frequencies, one of the transmission channels having a transmission rate substantially equal to a long-term average of information generation speeds in encoding an arbitrary motion picture signal;

a plurality of encoding means, arranged for the respective image channels, for encoding the input motion picture signal by using inter-frame and intra-frame correlations and outputting encoded information, each of said encoding means having a buffer memory for interfacing with said transmission line to temporarily store the encoded information and output at a designated rate, and outputting a generated information amount representing a generation speed of the encoded information;

variable rate multiplex means for designating an output rate of the encoded information with respect to each of said encoding means in accordance with the generated information amount output from said encoding means, adding identification information indicating a relationship with the image channel to an output from each of said encoding means, and for, when at least one image channel of interest exhibits the generated information amount exceeding the predetermined transmission rate, distributing the encoded information of the image channel of interest to at least two transmission channels of the transmission channels and outputting the information for each transmission channel;

a plurality of transmitting means for receiving pieces of information of the respective transmission channels from said variable rate multiplex means and outputting, at said designated output rate, signals caused to correspond to the respective transmission channels by using a predetermined modulation scheme;

a plurality of receiving means for respectively receiving and decoding outputs from said transmitting means;

variable rate separating means for receiving outputs from said receiving means, separating/grouping the outputs in units of the encoded information having the same identification information, and outputting the encoded information for the respective image channels at allocated rates; and a plurality of decoding means for temporarily storing the encoded information output from said variable rate separating means for the respective image channels in rate matching buffer memories at respective allocated rates, and decoding outputs from the buffer memories into the motion picture signals by using a predetermined decoding scheme;

wherein when the generated information amount of the image channel of interest exceed the predetermined transmission rate, said variable rate multiplexing means distributes the encoded information of the image channel of interest to a pre-designated specific transmission channel of the transmission channels, and outputs the information for each transmission channel, and said receiving means is arranged in correspondence with only the specific transmission channel to receive an output from said transmitting means in the specific transmission channel.

* * * * *